United States Patent [19]
Dowd et al.

[11] Patent Number: 5,081,788
[45] Date of Patent: Jan. 21, 1992

[54] WIND-ORIENTED FUNNEL TRAP

[75] Inventors: Patrick F. Dowd, Peoria; Robert J. Bartelt, East Peoria; Donald T. Wicklow, Peoria, all of Ill.

[73] Assignee: The United States of America as represented by the Secretary of Agriculture, Washington, D.C.

[21] Appl. No.: 694,534

[22] Filed: May 1, 1991

[51] Int. Cl.$^5$ .............................................. A01M 1/04
[52] U.S. Cl. ...................................... 43/107; 43/118; 43/122; 43/113
[58] Field of Search .................. 43/113, 118, 122, 107

[56] References Cited

U.S. PATENT DOCUMENTS

| | | | |
|---|---|---|---|
| 111,936 | 2/1871 | Horton et al. | |
| 418,233 | 12/1889 | Sallade | |
| 670,996 | 4/1901 | Morgan | 43/113 |
| 1,131,120 | 3/1915 | Crawford | 43/122 |
| 1,158,542 | 11/1915 | Noonan | |
| 1,313,986 | 8/1919 | Hardin | 43/118 |
| 1,487,091 | 3/1924 | Day | 43/118 |
| 1,543,228 | 6/1925 | Morrow | 43/118 |
| 1,936,644 | 11/1933 | Schroder | |
| 2,029,989 | 2/1936 | Driggers | 43/122 |
| 2,694,879 | 11/1954 | Stoll | 43/122 |
| 2,836,923 | 6/1958 | Stump | |
| 2,893,161 | 7/1959 | Reid | 43/113 |
| 3,196,577 | 7/1965 | Plunkett | |
| 3,855,727 | 12/1974 | Canoy | |
| 4,121,372 | 10/1978 | Landaus | 43/122 |
| 4,212,129 | 7/1980 | Shumate | 43/113 |
| 4,452,006 | 6/1984 | Steck et al. | |

FOREIGN PATENT DOCUMENTS 2097233 11/1982 United Kingdom .................. 43/107

OTHER PUBLICATIONS

Everett R. Mitchell et al., WORT: Wind-Oriented Trap for Simultaneous Evaluation of Several Pheromone Blends. J. Econ. Entomol. 81(3): 966–969 (Jun. 1988).

Primary Examiner—Kurt Rowan
Attorney, Agent, or Firm—M. Howard Silverstein; Randall E. Deck; John D. Fado

[57] ABSTRACT

An insect trap for attracting and capturing flying insects. The apparatus includes a chamber for holding an insect attractant and exposing the same to a current of air, and having a first opening allowing passage of air but not insects therein. Positioned opposite the first opening, at least one funnel-shaped entrance to the chamber allows entry of the insects into the trap, as well as passage of air currents and entrained attractant odors out of the trap. An insect collection container, optionally having a one-way entrance, is also provided, and communicates with the chamber through a second chamber opening and the one-way entrance. Proper orientation of the trap in the wind is achieved by mounting a wind vane or fins onto the exterior of the chamber so as to position the first opening upwind, and the funnel-shaped entrance to the chamber downwind from the first opening. In the alternative, the wind vane may be omitted and the chamber constructed in the shape of a wedge, tapering toward the first opening, to enable trap orientation in like manner.

28 Claims, 5 Drawing Sheets

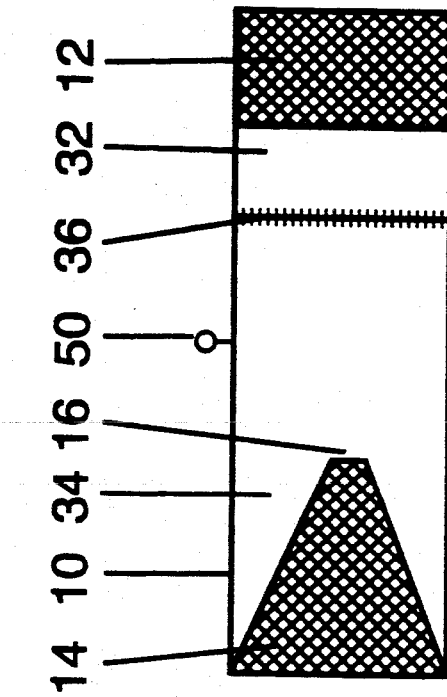
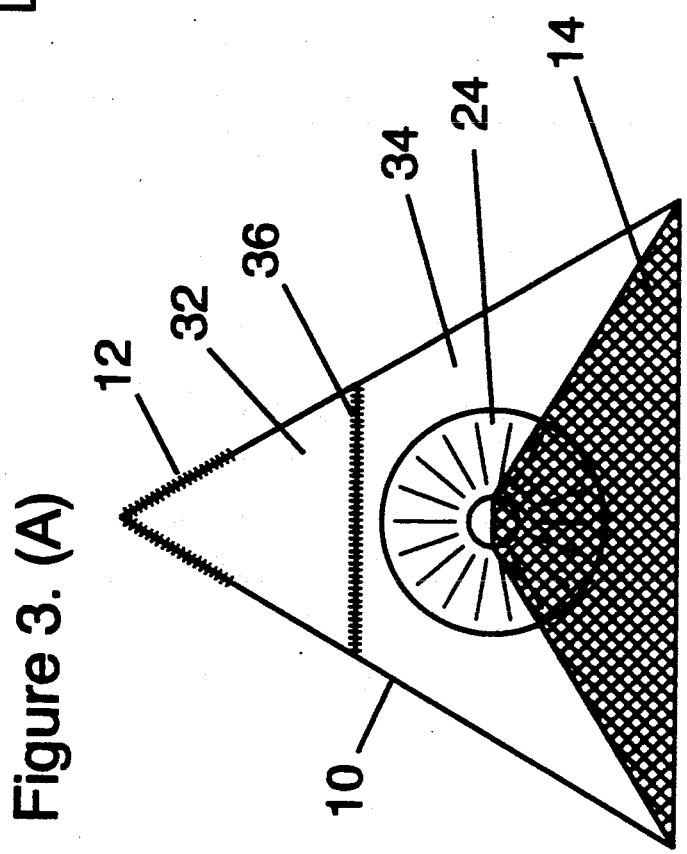
Figure 3. (B)
Figure 3. (A)

WIND-ORIENTED FUNNEL TRAP

BACKGROUND OF THE INVENTION

1. Field of Invention

This invention relates to a wind-oriented trap to attract and capture flying insects.

2. Description of the Prior Art

Insect traps have long been used for the control and/or monitoring of insect populations. Trap construction has varied widely from sticky traps to funnel or cone-orifice traps provided with insect baits or attractants, or lights, such as those described by Noonan (U.S. Pat. No. 1,158,542), Steck et al. (U.S. Pat. No. 4,452,006), Plunkett (U.S. Pat. No. 3,196,577), Canoy (U.S. Pat. No. 3,855,727), Schroder (U.S. Pat. No. 1,936,644), Horton et al. (U.S. Pat. No. 111,936), or Sallade (U.S. Pat. No. 418,233). While a number of trap designs have been developed, the need persists for an effective yet relatively inexpensive trap for improved attraction and capture of flying insects.

SUMMARY OF THE INVENTION

We have now invented a trap for attracting and capturing flying insects. The apparatus includes a chamber for holding an insect attractant and exposing and releasing the same to a current of air such as wind, and having a first opening allowing passage of air but not insects therein. Positioned approximately opposite the first opening, at least one funnel-shaped entrance to the chamber allows entry of the insects into the trap, as well as passage of air currents and entrained attractant odors out of the trap. An insect collection container, optionally having a one-way entrance, is also provided, and communicates with the chamber through a second chamber opening and the one-way entrance. Proper orientation of the trap in the wind is achieved by mounting a wind vane or fins onto the exterior of the chamber so as to position the first opening upwind, and the funnel-shaped entrance to the chamber downwind from the first opening. In the alternative, the wind vane may be omitted and the chamber aerodynamically constructed, such as in the shape of a wedge or cone, tapering toward the first opening, to enable trap orientation in like manner.

In use, wind orients the trap as described, maximizing air passage into the chamber through the first opening and subsequent entrainment of the attractant into the air current passing through and exiting the chamber through the funnel-shaped entrance. Insects attracted to the odor of the attractant will fly upwind to the source within the trap and enter the same through the funnel-shaped opening. Once inside the chamber, the insects will pass through the second chamber opening and the one-way opening into the collection chamber.

In accordance with this invention, it is an object to provide an apparatus for the enhanced attraction and capture of flying insects. It is a further object to provide a trap that orients in the wind to facilitate dispersal of the attractant into the atmosphere, and takes advantage of insects' natural behavior to fly upwind toward an odor source for entry into the trap.

Yet another object of this invention is to provide a trap which utilizes light attraction to encourage passage of insects within the trap into a collection container for further study or disposal.

Other objectives and advantages of the invention will become readily apparent from the ensuing description.

BRIEF DESCRIPTION OF THE DRAWINGS

FIGS. 3(a) and 3(b) are horizontal and vertical cross section, respectively, through a third embodiment of the insect trap of the invention having an aerodynamically shaped chamber.

DETAILED DESCRIPTION OF THE INVENTION

The apparatus of this invention was designed for attracting and capturing insects. While not being limited thereto, the device is especially suited to trapping flying insects which may be attracted to a bait, such as flies, moths, bees, and beetles and nitidulids including Carpophilus species.

Figure 1:
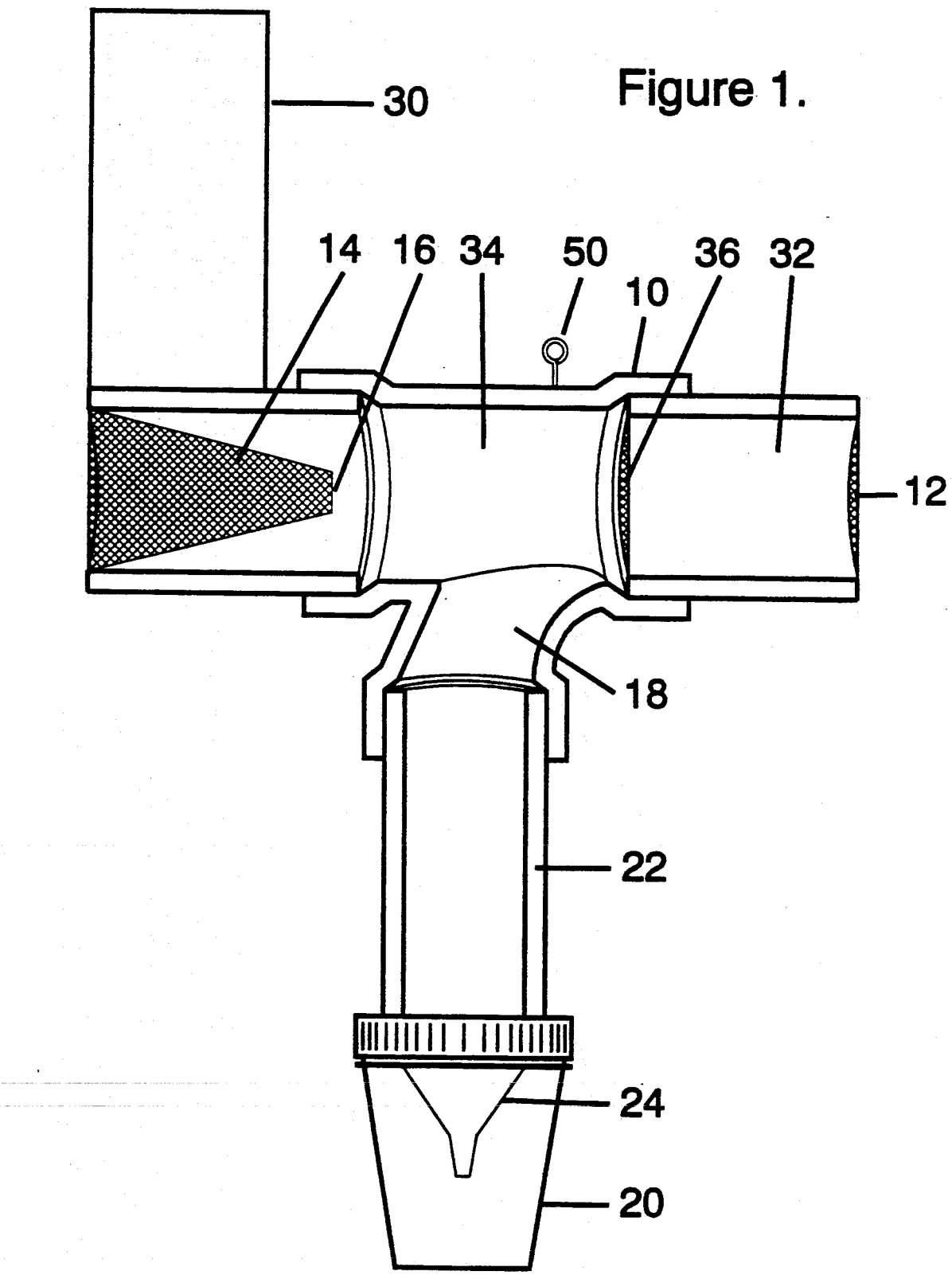
FIG. 1 is a vertical cross-section through a first embodiment of the insect trap of the invention having a single chamber entrance.

Referring now to FIG. 1, the insect trap includes a chamber (10) or enclosed container for holding an insect attractant or bait. A first opening (12) positioned on one side of the chamber (10) is constructed to allow passage of air but not insects into the chamber. While the first opening is advantageously formed from a hole in the chamber wall covered with a mesh or screen, the practitioner skilled in the art will recognize that other constructions could be employed, such as a foraminous wall having a plurality of small apertures. In either event, the mesh or aperture size is selected to allow maximum air flow into the chamber while preventing the passage of the target insects and other undesired insects.

Figure 2:
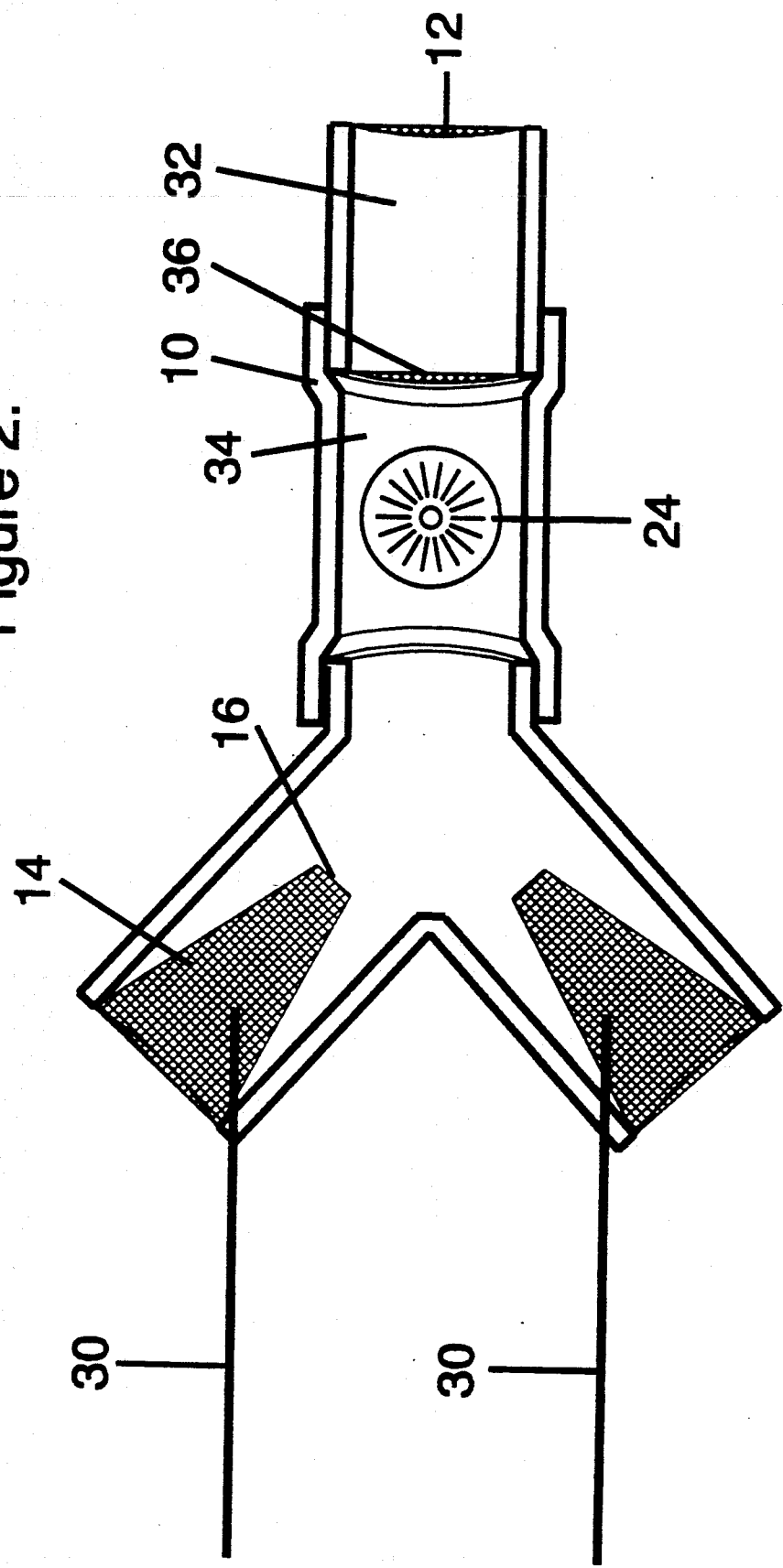
FIG. 2 is a horizontal cross-section through a second embodiment of the insect trap of the invention having two chamber entrances.

The chamber (10) is also provided with at least one chamber entrance (14) to allow passage of air currents and entrained attractant odors out of the trap, and entry of insects into the chamber. In the preferred embodiment, the entrance or entrances are positioned approximately opposite the first opening (12) on the chamber as shown, for example, in FIG. 2 having multiple entrances, or in FIGS. 1 and 3–5 having a single entrance. The use of multiple entrances splits the air flow out of the trap, providing the additional advantage of increasing the dispersion of the attractant odors over a greater area than may be achieved with a single entrance trap. The practitioner skilled in the art will recognize that the number and positioning of these entrances may be altered to vary the attractant dispersal patterns from the trap.

The entrances (14) may be frustroconical or funnel-shaped, tapering toward the chamber interior or first opening, and having an aperture (16) at the apex thereof of a size small enough to allow passage of target insects into the chamber while inhibiting their ready egress therefrom, and also preventing entry of larger, undesirable or non-target insects. Although the funnel-shaped entrance may be constructed from virtually any material, it is preferably formed from a mesh or screen or other foraminous material having openings effective to prevent passage of the target insects, for the purpose of increasing air flow through the chamber and allowing any smaller, undesirable or non-target insects to exit the chamber. Optionally, an additional foraminous material (not shown) may be positioned adjacent the chamber entrance (14) and having holes or a mesh size small enough to allow passage of target insects, while screening or preventing passage of any larger, undesirable non-target insects into the trap.

Containment and ready removal of the insects from the trap is aided by the inclusion of an insect collection container or receptacle (20) communicating with the chamber (10) through a second opening (18) in the chamber wall. The collection container may be directly or indirectly connected to the chamber, such as through a conduit (22). In the preferred embodiment, the collection container includes a one-way entrance (24), defined herein as an entrance which readily allows passage of the target insects from the chamber into the collection container (forward direction), while inhibiting or limiting their passage in the opposite direction. Without being limited thereto, suitable one-way entrances include funnel-shaped or frustroconical passages tapering toward the interior of the collection container, conduits lined with hairs, bristles or wires angled toward the container interior, or swinging gates. In one alternative, the one-way entrance could be replaced by a narrow conduit or perforated plate having apertures with a diameter approximately equal to or slightly larger than the cross-section of the target insect.

Passage of the insects from the chamber (10) to the collection container (20) may be substantially encouraged by constructing all or a portion of the collection container from a transparent or other light transmissive material, while forming the walls of the chamber from a non-light transmissive material. In use, insects trapped within the relatively dark chamber (10) will be attracted to the container by light therefrom.

The container (20) may take any number of suitable shapes and sizes ranging, for example, from cups or vials or flasks to flexible bags. The container may also be formed from a variety of materials, including but not limited to plastics, glass, metal or mesh. To facilitate ready collection and/or disposal of the captured insects and reuse of the trap, the container is preferably removably attached to the chamber. Optionally, the container may be sterilized or disinfected to allow microbiological testing of captured insects using techniques conventional in the art.

Proper orientation of the trap in the field with the first opening (12) into the wind is achieved by mounting a wind vane or fin (30) onto the exterior of the chamber of the trap as shown in FIGS. 1, 2, 4 and 5. In the alternative, the trap or chamber may be aerodynamically shaped such as a cone or wedge as shown in FIGS. 3(a) and 3(b), tapering toward the first opening (12), to allow the trap to orient into the wind in the same manner. The combination of the orientation of the first opening (12) into the wind together with the position of the chamber entrance (14) approximately opposite the windward first opening maximizes air flow into and out of the chamber, accompanied with greater entrainment of the attractant odors from a bait placed in the trap. This in turn translates into increased attractant dissemination into the environment and insect attraction to the trap.

The chamber may be divided into first and second compartments (32 and 34) separated by a foraminous barrier (36), such as a mesh or screen, allowing passage of air but not target insects, the first opening (12) being located in the first compartment, and the chamber entrance (14) and second opening (18) being located in the second compartment. Separation of the chamber in this manner allows placement of the attractant or bait in the first compartment where it is protected from contamination or destruction by the target insects entering the trap but retained in the second compartment or collection container (20).

Figure 4:
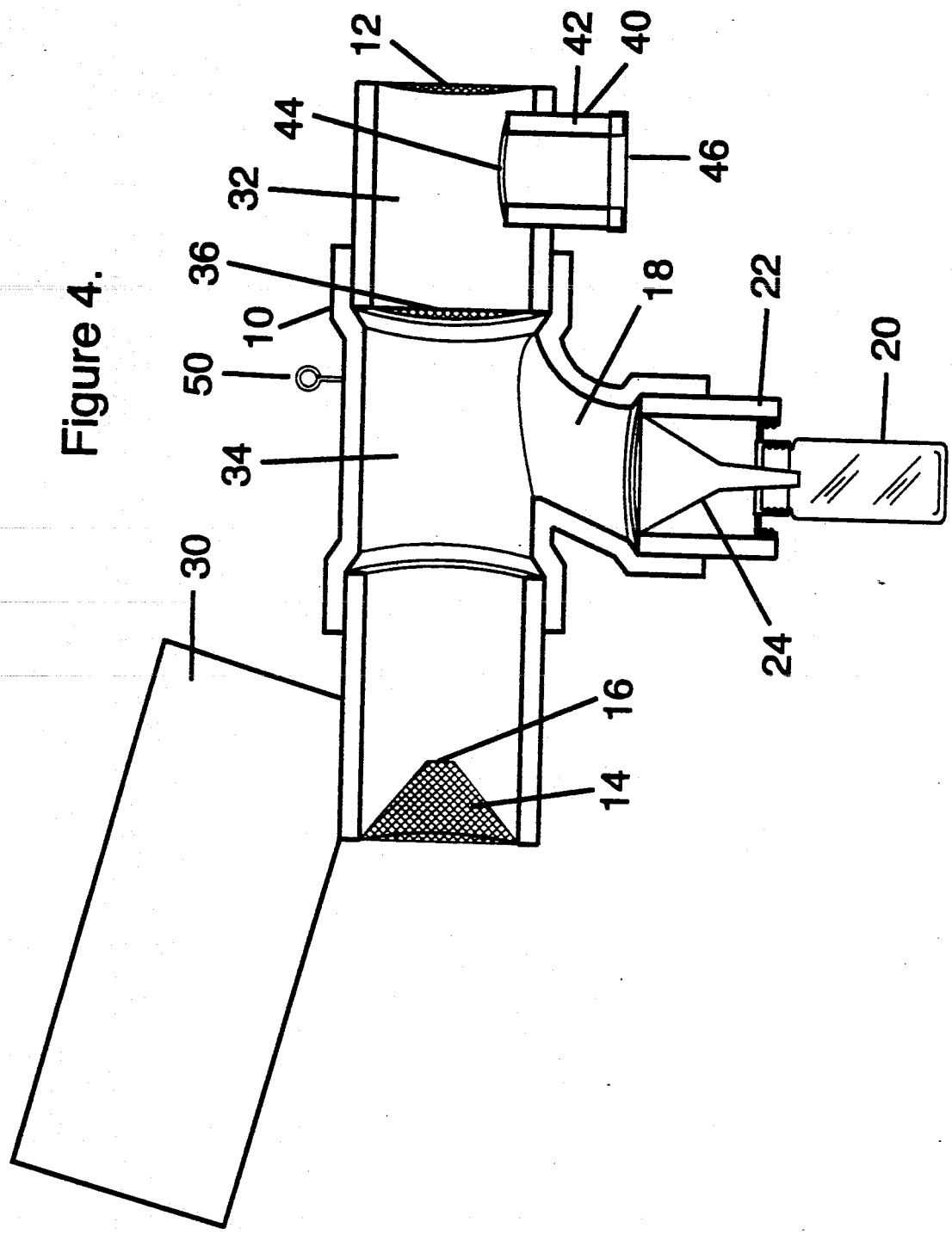
FIG. 4 is a vertical cross-section through a fourth embodiment of the insect trap.

An attractant container (40), shown in FIG. 4, may also be provided in communication with and connected to the chamber, or the first compartment if the chamber is divided. When using liquid and/or relatively volatile attractants, the attractant container conveniently holds the attractant and reduces its direct exposure to air currents or wind, decreasing the volatilization of the attractant into the air and prolonging its usable life. The practitioner in the art will recognize that the shape of the attractant container can be selected to provide varying degrees of exposure of the attractant to air currents, for example, by raising or lowering the height of the container walls (42), varying the area of the container opening (44), or partially covering the container opening. Alternatively, a semi-permeable membrane or film may be attached over the container opening to control the release of the attractant odors into the atmosphere. When removably connected to the chamber or when provided with a removable access port (46), the attractant container provides the dual advantage of allowing the attractant or bait to be readily replenished or replaced.

The trap may be constructed as a one piece disposable unit. Ideally however, the trap will be modular in construction, with the trap components being removably connected for ease of removal of trapped insects, cleaning and reuse. The chamber may be constructed in a variety of shapes and from a variety of materials. Without being limited thereto, in a particularly preferred construction as shown in the drawings, the chamber (10) may be formed from flush fitting sections of plastic pipe. The chamber may be formed from three such sections of pipe, separate pieces including the first opening, the second opening and the chamber entrance, and the conduit (22), respectively. In addition, the trap may be formed in a variety of colors, selected to take advantage of the known preference of insects to particular colors.

In use, a bait effective to attract the target insect is provided in the chamber, specifically in the first compartment (32) or attractant container (40) if employed. Insect attractants and baits for a variety of insects are well known, and suitable atractants and their amounts may be readily determined by the practitioner skilled in the art. The practitioner will also recognize that the attractants may be applied in conjunction with a suitable inert carrier or vehicle as known in the art. Optionally, an insecticide or a soapy solution may be provided within the collection container (20) to kill the insects trapped therein and prevent any possible escape. The assembled trap is then simply positioned in the locus of or in the vicinity of the target insects and pivotally mounted above the ground to allow the trap to freely orient in the wind. In this regard, the trap may be hung from a standing support using, for example, a screw eye (50) attached to a snap swivel, or in the alternative pivotally mounted to the top of a post, as upon ball bearings. The trap may be disposed of when full, or periodically inspected to monitor and remove trapped insects and/or replenish attractant.

An alternative embodiment of the trap is shown in FIG. 4 which is substantially the same as the trap of FIG. 1 but having variations of the wind vane (30), and the collection container (20) and its one-way entrance (24). The trap of this embodiment also employs an attractant container (40) as described herein above.

Figure 5:
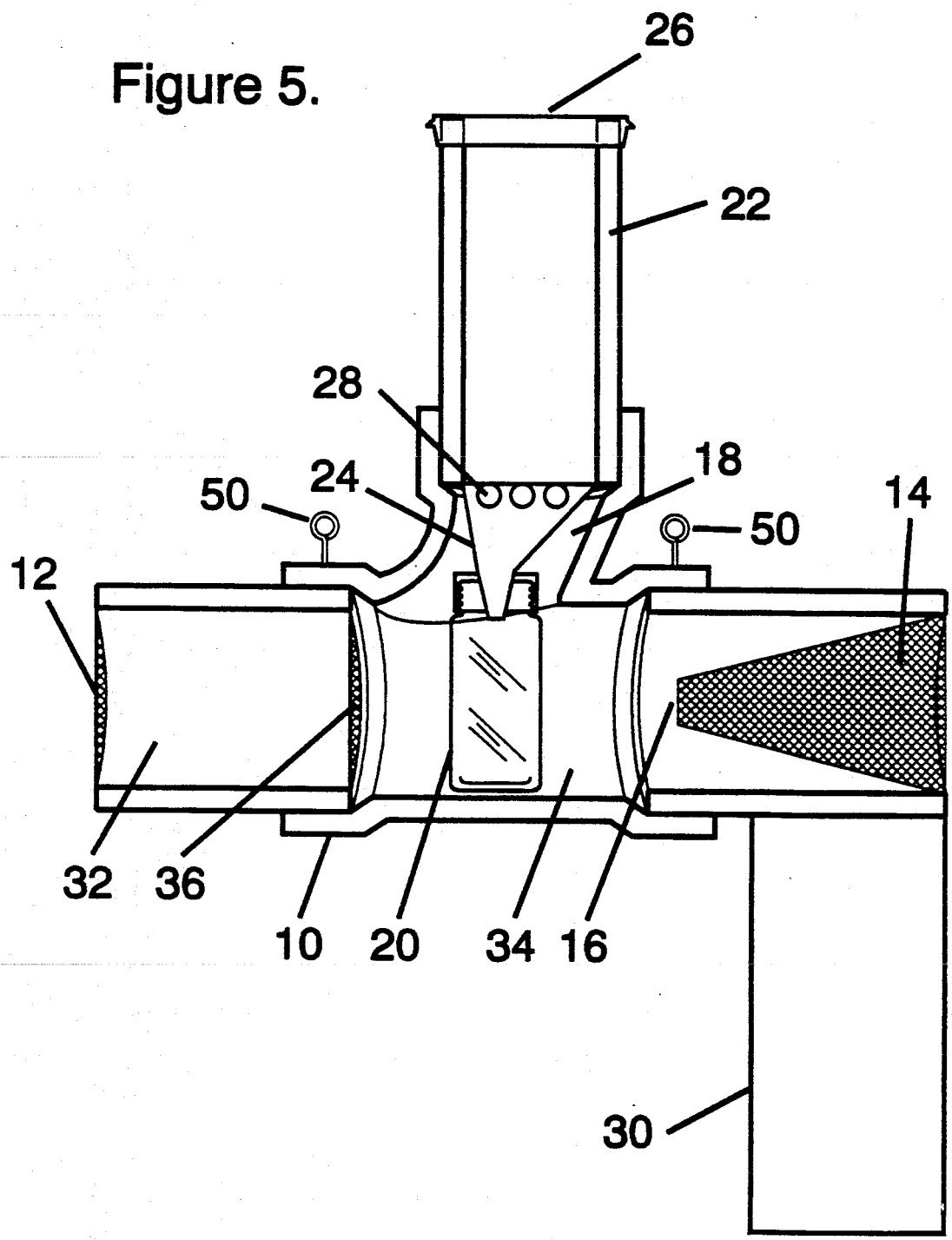
FIG. 5 is a vertical cross-section through a fifth embodiment of the insect trap.

Yet another alternative embodiment is exemplified in FIG. 5 which not only allows for trapping and monitoring insect populations, but also allows for improved identification and monitoring of microorganisms, including pathogens, which may be carried by the insects. Determination of microorganism populations in this manner is valuable both as a tool in the study of the insects as well as recognizing potential disease sources. Unlike the traps of the previous embodiments, the chamber (10) or preferably the conduit (22) include a culture container (26), such as a petri dish or cap, which may be sterile. In use, insects within the trap will land and/or defecate upon the interior of the culture container, depositing microorganisms thereon. After a suitable period of time, the culture container may be removed, a conventional culture medium, such as a medium selective for a microorganism of interest, added thereto, and the container incubated under appropriate conditions. Subsequent examination of the culture using techniques conventional in the art will allow characterization of the microorganism population. It has been found that microorganism cultures obtained through use of the trap of this embodiment are substantially less subject to contamination by airborne microorganisms or pollen than those obtained using conventional techniques in the art. Without wishing to be bound by theory, it is believed that the predominant pattern of air flow through the chamber (10) is directly from the first opening (12) to the chamber entrance (14), with relatively little air flow into the conduit (22). Thus any airborne contaminants are unlikely to pass into the conduit or into contact with the culture container (26).

Without being limited thereto, a particularly preferred structure includes the second opening (18) positioned upon the top of the chamber (10) with the conduit (22) extending vertically upward therefrom. The culture container or other closure (26) may be provided at the top end of the conduit, constructed from a transparent material to facilitate light attraction of insects from the chamber. Removal of the insects within the conduit is facilitated by positioning the collection container (20) either radially inwardly of and within the conduit (22) or below the conduit within the chamber (10), and directly below the culture container (26) to catch falling insects. The one-way entrance (24) to the collection container (20) may be formed as a funnel-shaped member tapering toward and connected to the open end of the collection container (20), and which includes a portion extending outwardly from the collection container which is attached to the interior or lower end of the conduit (22). The funnel-shaped member is provided with at least one aperture (28) at the portion between the conduit and the collection container of a size effective to allow target insects to pass from the chamber into the conduit. When used, insects within the chamber (10) will be attracted to the light from the chamber, pass through apertures (28) into the conduit (22) and land upon the interior of culture container (26). Eventually, insects within the conduit will fall or otherwise pass through the one-way entrance (24) into the collection container (20) where they may be readily disposed of.

It is understood that the foregoing detailed description is given merely by way of illustration and that modifications and variations may be made therein without departing from the spirit and scope of the invention.

We claim:

1. An insect trap comprising:
   a. a chamber for holding an insect attractant and exposing said attractant to a current of air, said chamber having first and second openings, said first opening positioned on a side of said chamber and allowing passage of air but not said insects into said chamber;
   b. at least one funnel-shaped entrance to said chamber positioned approximately opposite said first opening, and tapering toward said first opening;
   c. a collection container having an entrance, said container communicating with said chamber through said second opening and said entrance;
   d. a wind vane mounted to the exterior of said chamber for orienting said first opening upwind of said funnel-shaped entrance.

2. An insect trap as described in claim 1 wherein said entrance to said collection container is a one-way entrance.

3. An insect trap as described in claim 1 wherein said chamber includes first and second compartments separated by a foraminous barrier allowing passage of air but not said insects, said first opening being in said first compartment, said funnel-shaped entrance and said second opening being in said second compartment, and said collection container communicating with said second compartment.

4. An insect trap as described in claim 1 wherein said first opening includes an aperture through said side of said chamber and a foraminous barrier positioned over said aperture, said barrier having openings effective to allow passage of air but not said insects into said chamber.

5. An insect trap as described in claim 1 wherein said chamber is cylindrically shaped, said first opening and said funnel-shaped entrance being at opposite ends of the cylinder.

6. An insect trap as described in claim 1 wherein said funnel-shaped entrance is constructed from a foraminous material having openings effective to prevent passage of said insects.

7. An insect trap as described in claim 1 wherein at least a portion of said collection container is formed from a light transmissive material and at least a portion of said chamber is formed from an opaque material.

8. An insect trap as described in claim 1 wherein said second opening is on the top of said chamber intermediate said first opening and said funnel-shaped entrance; said chamber includes an upwardly extending conduit having an open end connected to said second opening, and a closed end positioned away from said chamber, and said collection chamber communicating with said chamber through said conduit; said collection container having an open end and a closed end, and positioned below said closed end of said conduit with said closed end of said container toward said chamber; and said entrance to said collection chamber comprises a funnel-shaped member connected to said collection container and tapering toward said closed end of said collection container, said funnel-shaped member including a portion extending outwardly from said container, which said portion is attached to said conduit and includes at least one aperture between said conduit and said collection container of a size effective to allow said insects to pass from said chamber into said conduit.

9. An insect trap as described in claim 1 wherein said collection container is removably connected to said chamber.

10. An insect trap as described in claim 9 wherein said one-way entrance is removably connected to said collection container.

11. An apparatus as described in claim 1, further comprising an attractant container in communication with said chamber.

12. An apparatus as described in claim 1 including a plurality of said funnel-shaped entrances to said chamber.

13. An apparatus as described in claim 1 including one said funnel-shaped entrance to said chamber.

14. An insect trap comprising:
   a. a chamber for holding an insect attractant and exposing said attractant to a current of air, said chamber having first and second openings, said first opening positioned on a side of said chamber and allowing passage of air but not said insects into said chamber;
   b. at least one funnel-shaped entrance to said chamber positioned approximately opposite said first opening, and tapering toward said first opening;
   c. a collection container having an entrance, said container communicating with said chamber through said second opening and said entrance; and wherein said chamber is wedge shaped, tapering toward said first opening for orienting said first opening upwind of said funnel-shaped entrance.

15. An insect trap as described in claim 14 wherein said entrance to said collection container is a one-way entrance.

16. An insect trap as described in claim 14 wherein said chamber includes first and second compartments separated by a foraminous barrier allowing passage of air but not said insects, said first opening being in said first compartment, said funnel-shaped entrance being in said second compartment, and said collection container communicating with said second compartment.

17. An insect trap as described in claim 14 wherein said first opening includes an aperture through said side of said chamber and a foraminous barrier positioned over said aperture, said barrier having openings effective to allow passage of air but not said insects into said chamber.

18. An insect trap as described in claim 14 wherein said first opening and said funnel-shaped entrance being at opposite ends of the chamber.

19. An insect trap as described in claim 14 wherein said funnel-shaped entrance is constructed from a foraminous material having openings effective to prevent passage of said insects.

20. An insect trap as described in claim 14 wherein at least a portion of said collection container is formed from a light transmissive material and at least a portion of said chamber is formed from an opaque material.

21. An insect trap as described in claim 14 wherein said second opening is on the top of said chamber intermediate said first opening and said funnel-shaped entrance; said chamber includes an upwardly extending conduit having an open end connected to said second opening, and a closed end positioned away from said chamber, and said collection chamber communicating with said chamber through said conduit; said collection container having an open end and a closed end, and positioned below said closed end of said conduit with said closed end of said container toward said chamber; and said entrance to said collection chamber comprises a funnel-shaped member connected to said collection container and tapering toward said closed end of said collection container, said funnel-shaped member including a portion extending outwardly from said container, which said portion is attached to said conduit and includes at least one aperture between said conduit and said collection container of a size effective to allow said insects to pass from said chamber into said conduit.

22. An insect trap as described in claim 14 wherein said collection container is removably connected to said chamber.

23. An insect trap as described in claim 22 wherein said one-way entrance is removably connected to said collection container.

24. An apparatus as described in claim 14, further comprising an attractant container in communication with said chamber.

25. An apparatus as described in claim 14 including a plurality of said funnel-shaped entrances to said chamber.

26. An apparatus as described in claim 14 including one said funnel-shaped entrance to said chamber.

27. A method for trapping flying insects comprising the step of positioning an insect trap containing an insect attractant in the locus of said flying insects, said trap comprising:
   a. a chamber for holding said insect attractant and exposing said attractant to a current of air, said chamber having first and second openings, said first opening positioned on a side of said chamber and allowing passage of air but not said insects into said chamber;
   b. a funnel-shaped entrance to said chamber positioned approximately opposite said first opening, and tapering toward said first opening;
   c. a collection container having an entrance, said container communicating with said chamber through said second opening and said entrance;
   d. a wind vane mounted to the exterior of said chamber for orienting said funnel-shaped entrance downwind from said first opening.

28. A method for trapping flying insects comprising the step of positioning an insect trap containing an insect attractant in the locus of said flying insects, said trap comprising:
   a. a chamber for holding said insect attractant and exposing said attractant to a current of air, said chamber having first and second openings, said first opening positioned on a side of said chamber and allowing passage of air but not said insects into said chamber;
   b. a funnel-shaped entrance to said chamber positioned approximately opposite said first opening, and tapering toward said first opening;
   c. a collection container having an entrance, said container communicating with said chamber through said second opening and said entrance; and wherein said chamber is wedge shaped, tapering toward said first opening for orienting said funnel-shaped entrance downwind from said first opening.

* * * * *